US007130804B2

(12) United States Patent
Fujiwara

(10) Patent No.: US 7,130,804 B2
(45) Date of Patent: Oct. 31, 2006

(54) METHOD OF SUPPORTING SALES AND MAINTENANCE OF STEAM TRAPS AND AGGREGATING SYSTEM FOR USE IN THE METHOD

(75) Inventor: Yoshiyasu Fujiwara, Kakogawa (JP)

(73) Assignee: TLV Co., Ltd., Hyogo-ken (JP)

( * ) Notice: Subject to any disclaimer, the term of this patent is extended or adjusted under 35 U.S.C. 154(b) by 960 days.

(21) Appl. No.: 10/016,241

(22) Filed: Oct. 31, 2001

(65) Prior Publication Data

US 2002/0052716 A1  May 2, 2002

(30) Foreign Application Priority Data

Nov. 1, 2000  (JP)  .............................. 2000-334535

(51) Int. Cl.
G06Q 99/00 (2006.01)
G06Q 30/00 (2006.01)
G06F 11/30 (2006.01)
G01L 7/00 (2006.01)
G01M 19/00 (2006.01)

(52) U.S. Cl. .......................... 705/1; 705/400; 702/182; 73/710; 73/865.8

(58) Field of Classification Search .................... 705/1, 705/7, 27, 400, 8, 9, 10, 11, 26; 715/744; 702/182; 73/40.5, 710

See application file for complete search history.

(56) References Cited

U.S. PATENT DOCUMENTS 4,788,849 A * 12/1988 Yonemura et al. ........ 73/40.5 A
5,311,562 A    5/1994 Palusamy et al.
5,535,136 A    7/1996 Standifer (Continued)

FOREIGN PATENT DOCUMENTS

EP    0 892 326 A2    1/1999

(Continued)

OTHER PUBLICATIONS

Moore, Frank E., Cut Stream-Trap Costs; Identifying the best traps for a given application is the key to slashing maintenance costs, Oct. 1996, vol. 103, Iss. 10, p. 132.*
Patent Abstracts of Japan, JP-09 054841, Feb. 25, 1997, TLV Co Ltd.

Primary Examiner—John W. Hayes
Assistant Examiner—Fadey Jabr
(74) Attorney, Agent, or Firm—The Webb Law Firm

(57) ABSTRACT

Disclosed is a system for supporting sales and maintenance activities of steam traps by a seller of the traps to a customer. The system utilizes an aggregating system which effects a step of inputting stored diagnostic result data and model confirmation result data from a diagnostic device which has diagnosed a working condition of each of a plurality of existing steam traps installed in a customer's plant. Based on the diagnostic result data, a first total steam loss amount due to malfunction of steam traps is calculated, the first total steam loss amount comprising aggregation of steam leak amounts of all the existing steam traps. Based on the model confirmation result data, a second total steam loss amount is calculated, which comprises aggregation of differences between inherent steam leak amounts of the existing steam traps under their normal working conditions and inherent steam leak amounts of recommended steam traps under their normal working conditions. A monetary conversion value of an integrated value of a sum of the first total steam loss amount and the second total steam loss amount integrated for a predetermined period is calculated. Comparison data is generated allowing comparison between the monetary converted value and a replacement cost required for lump-sum replacement of all the existing steam traps by the recommended steam traps. The comparison data is outputted for presentation to the customer in sales and/or maintenance activities of the recommended steam traps.

17 Claims, 7 Drawing Sheets

U.S. PATENT DOCUMENTS

| | | | |
|---|---|---|---|
| 6,581,045 B1 * | 6/2003 | Watson | 705/400 |
| 6,880,128 B1 * | 4/2005 | Nguyen | 715/744 |
| 2001/0007093 A1 * | 7/2001 | Nguyen | 702/182 |
| 2002/0035495 A1 * | 3/2002 | Spira et al. | 705/7 |
| 2002/0124666 A1 * | 9/2002 | Navarro et al. | 73/865.8 |
| 2002/0161614 A1 * | 10/2002 | Sprira et al. | 705/7 |

FOREIGN PATENT DOCUMENTS

| | | | |
|---|---|---|---|
| EP | 0892326 A2 * | 1/1999 | |
| EP | 0972982 A2 * | 7/1999 | |
| EP | 0 972 982 A2 | 1/2000 | |
| GB | 2189321 A * | 10/1987 | |
| JP | 614381 | 2/1994 | |
| JP | 6241956 | 9/1994 | |
| JP | 8329147 | 12/1996 | |
| JP | 96847 | 1/1997 | |
| JP | 954841 | 2/1997 | |

* cited by examiner

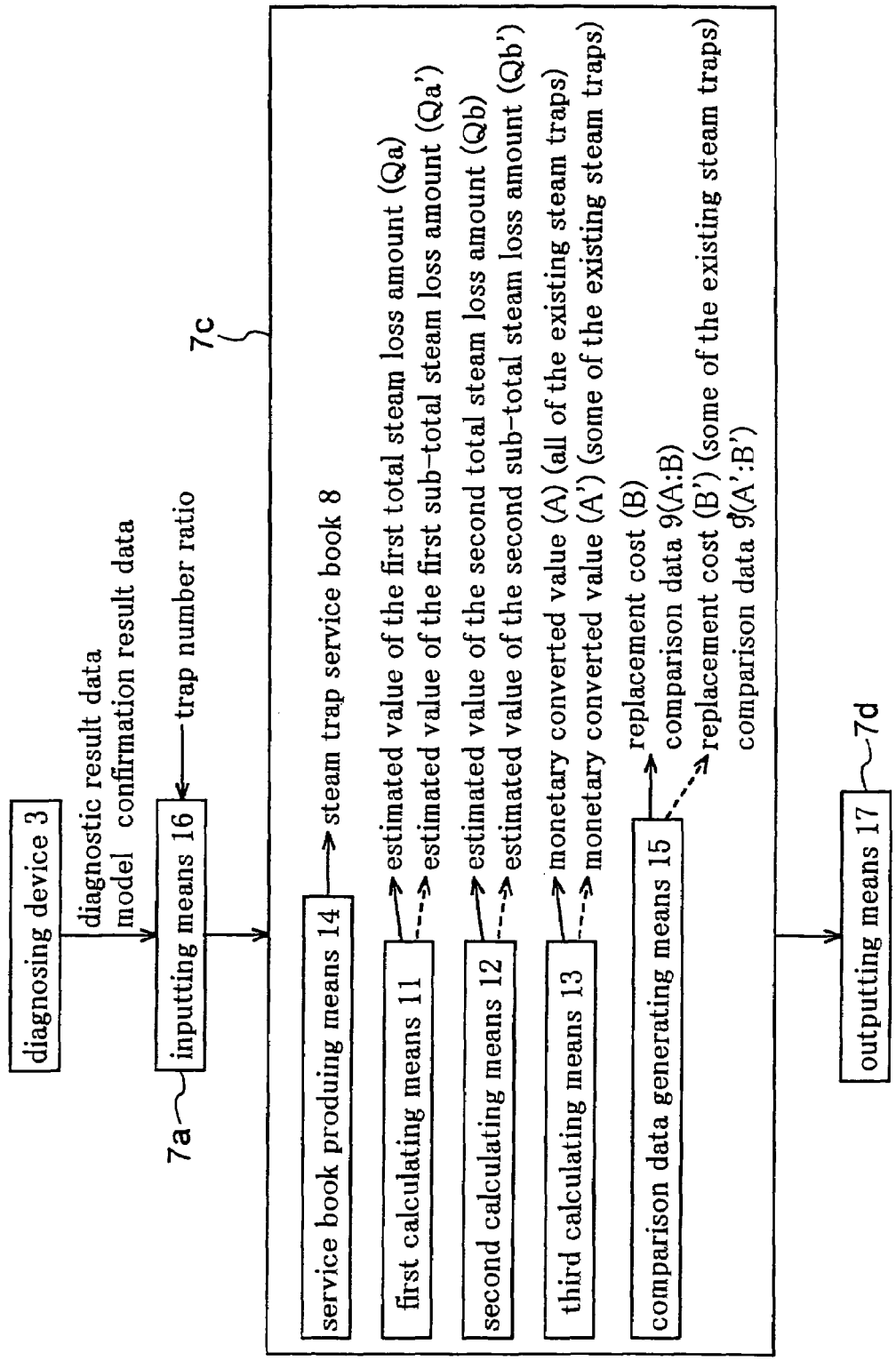

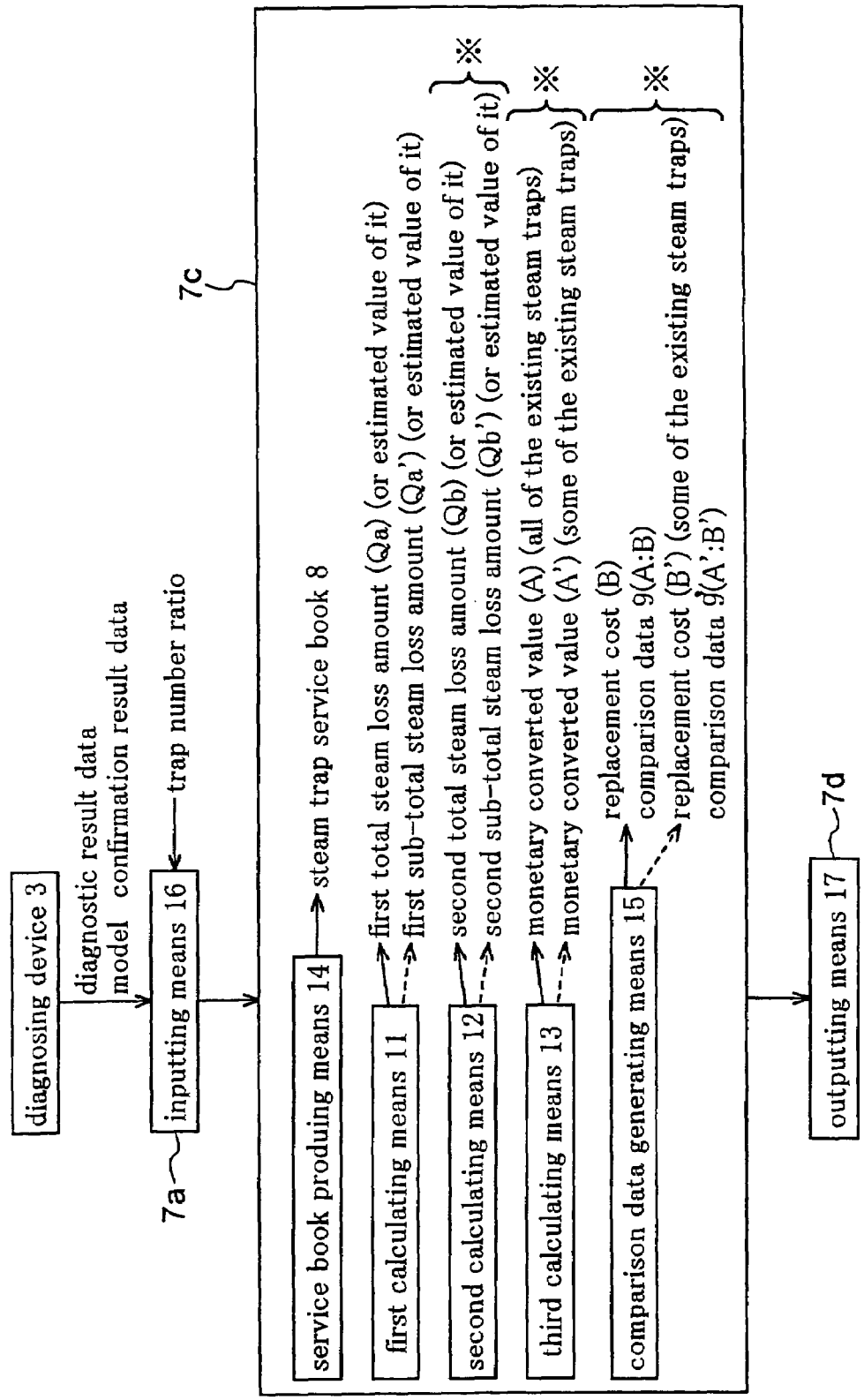

METHOD OF SUPPORTING SALES AND MAINTENANCE OF STEAM TRAPS AND AGGREGATING SYSTEM FOR USE IN THE METHOD

BACKGROUND OF THE INVENTION

1. Technical Field of the Invention

The present invention relates to a method of supporting sales and maintenance of steam traps. The invention relates also to an aggregating system for use in the method.

2. Description of the Related Art

For maintenance of a great number of steam traps installed in a factory or plant, there has been proposed a system in which a working condition of each steam trap is diagnosed by a diagnostic device and based on the diagnostic result data obtained for all the steam traps, a host computer calculates a total steam leakage amount relating to total steam loss due to malfunction of the defective steam traps and a monetary converted value of the loss (Japanese published patent gazette No. Hei. 6-14381).

There has been also proposed a system for predicting a replacement/repair fining of each steam trap. In this system, based on diagnostic result data obtained by a diagnostic device for each steam trap, a monetary converted value of a steam leakage amount due to malfunction of the steam trap is calculated and this calculated monetary converted value is stored for each day of diagnosis. Then, this stored monetary converted value is subjected to a statistical regression operation to obtain regression data, which data is subsequently compared with a cost required for replacement/repair of the steam trap, whereby the replacement/repair timing of the steam trap is predicted (Japanese laid-open patent gazette No. Hei. 9-54841).

Conventionally, although the total steam loss due to malfunction of the defective steam trap(s) and a monetary converted value of the loss are calculated and the replacement/repair timing of each steam trap is predicted by using the systems described above, in actually replacing the steam trap, it would be the conventional practice to replace only the steam trap(s) diagnosed as being defective.

Further, even if the replacement timing of the steam trap is predicted by the latter-described system, this prediction would be made based only on comparison between the monetary converted value of the total steam loss due to the malfunction and the cost required for the replacement.

However, steam leak occurs even with a steam trap which is functioning properly and the amount of steam leak (i.e. the steam leak which inevitably occurs when the tap is functioning properly due to certain technical principle of the trap) significantly varies, depending on the particular type or model of the steam trap. For this reason, if only defective steam traps are replaced among numerous steam traps presently installed, the existing steam traps of those types with inherently large leak amounts will be in use continuously. So that, it is not possible to effectively reduce the economic loss suffered by the entire plant due to the steam loss. In this regard, the conventional systems did not allow effective use of significant costs invested on the maintenance of the steam traps of the entire plant.

Further, even if replacement is to be made, when the timing of such replacement is determined based on the simple comparison between the monetary converted value of the total steam loss amount due to malfunction and the cost required for the replacement, the timing of replacement thus determined will be only after the portion of the loss due to the model difference has become too large. So that, the merit of replacement cannot be fully utilized. In this respect too, the significant replacement costs to be invested on the maintenance and replacement of the steam traps of the entire plant cannot be effectively utilized.

The causes of these problems will lie mostly in the contents of the services proposed by the seller of the steam traps to the customer of the plant and also in how the seller proposes and presents such contents to the customer.

SUMMARY OF THE INVENTION

The present invention has been made in view of the problems described above. A primary object of the present invention is to overcome these problems by proposing a reasonable method which supports the seller of the steam trap when the seller makes proposal to the customer regarding sales and maintenance of steam traps.

For accomplishing the above-noted object, according to the present invention, in a method of supporting sales and maintenance of steam traps, the method utilizes an aggregating system which effects the steps of:

inputting stored diagnostic result data and model confirmation result data from a diagnostic device which has diagnosed a working condition of each of a plurality of existing steam traps installed in a customer's plant;

calculating, based on said diagnostic result data, a first total steam loss amount due to malfunction of steam traps, the first total steam loss amount comprising aggregation of steam leak amounts of all the existing steam traps;

calculating, based on said model confirmation result data, a second total steam loss amount, which comprises aggregation of differences between inherent steam leak amounts of the existing steam traps under their normal working conditions and inherent steam leak amounts of recommended steam traps under their normal working conditions;

calculating a monetary conversion value of an integrated value of a sum of the first total steam loss amount and the second total steam loss amount integrated for a predetermined period;

generating comparison data allowing comparison between said monetary converted value and a replacement cost required for lump-sum replacement of all the existing steam traps by the recommended steam traps; and outputting said comparison data for presentation to the customer in sales and/or maintenance activities of the recommended steam traps.

With this a system for supporting sales and maintenance of steam traps, the sum of the first total steam loss amount (i.e. the actual steam loss amount suffered by the entire plant due to malfunction of existing steam traps) and the second total steam loss amount (i.e. the latent steam loss amount suffered by the entire plant due to the model difference between the existing steam traps and the recommended steam traps) is obtained and then this sum is integrated for a predetermined period (for example, for the guarantee period of the recommended steam trap) to obtain the integrated value and this integrated value is converted into the monetary converted value. Thereafter, this monetary converted value and the cost required for lump-sum replacement of all the existing steam traps by the recommended steam traps are outputted as comparison data to the customer. Therefore, with the presentation of such comparison data, the customer can determine the replacement of all of the steam traps at the most economically appropriate timing, taking into consideration not only the actual economic loss due to the malfunctioning ones among the existing steam traps, but also the latent economic loss due to the model difference between the existing steam traps and the recommended steam traps.

And, as the customer makes determination regarding the lump-sum replacement of the existing steam traps of the plant by the recommended steam traps, it is possible to avoid the problem of the conventional method or system involving partial replacement, i.e. replacement of only those malfunctioning steam traps, that is, the problem of inability to reduce effectively the economic loss due to steam leak for the entire plant. In addition, the other problem of timing associated with the further conventional art which determines replacement timing based on simple comparison between the monetary converted value of the first total steam loss amount and the cost required for replacement, that is the problem of inability of the customer to make the best of the economical merit of the steam trap replacement, can be avoided effectively also. Consequently, the customer can most effectively utilize the cost invested on the entire plant for the maintenance of the steam traps.

Further, as the aggregating system automates the calculations of the first total steam loss amount due to malfunction of steam traps and the second total steam loss amount due to model difference of steam traps, the above construction provides the seller of the steam traps with advantage of reduction in the trouble of aggregation as well as the further advantage of speedy response to the customer enabled by reduction in time required for presenting the comparison data to the customer.

According to a second feature of the invention's method of supporting sales and maintenance of steam traps, in the construction having a first feature described above, in said inputting step, the aggregating system inputs stored diagnostic result data and model confirmation result data from the diagnostic device which has diagnosed a working condition of each of some of the plurality of existing steam traps installed in the customer's plant; and in said step of calculating the first total steam loss amount, the system calculates an estimated value of the first steam loss amount based on the diagnostic result data and also on a trap number ratio comprising a ratio between the number of said some steam traps diagnosed and the total number of the existing steam traps;

in said step of calculating the second total steam loss amount, the system calculates an estimated value of the second total steam loss amount based on said model confirmation result data and also on said trap number ratio; and in said step of calculating the monetary conversion value, the system calculates the monetary conversion value of an integrated value of a sum of the estimated value of the first total steam loss amount and the estimated value of the second total steam loss amount for the predetermined period.

That is to say, with this method of supporting sales and maintenance of steam traps, the aggregating system obtains the sum of the estimated value of the first total steam loss amount and the estimated value of the second total steam loss amount and then obtains the integrated value thereof integrated for a predetermined period and eventually the monetary converted value of the integrated value. Thereafter, the system can output comparison data comparing the monetary converted value of the integrated value integrated for the predetermined period and the cost required for lump-sum replacement of the existing steam traps for presentation to the customer. Hence, in the respect of effective utilization of cost to be invested on the maintenance of the steam traps, the method having the second feature can achieve substantially same advantage as the first method described hereinbefore.

In addition, according to this method of supporting sales and maintenance of steam traps, only some of the existing steam traps installed in the plant are diagnosed for their working conditions and the model of these selected steam traps is confirmed. Then, based on their diagnostic result data and model confirmation result data, the estimated value of the first total steam loss amount and the estimated value of the second total steam loss amount are obtained, based on the trap number ratio between the number of the selected existing steam traps diagnosed and the total number of the existing steam traps installed in the plant. Therefore, compared with the construction having the first feature in which the working condition diagnosis and the model confirmation are carried out for all of the existing steam traps, the trouble and time required for the diagnosis and the model confirmation may be reduced and the time required therefor may be reduced correspondingly. Consequently, combined with the advantageous effect due to the automated aggregation by the aggregating system, it becomes possible to respond to the customer even more speedily.

According to a third feature, in the method of supporting sales and maintenance of steam traps having the first or second feature, the system effects the further step of adding, to a contract for lump-sum replacement of the steam traps to be concluded between the customer and a seller of the steam traps, a maintenance contract for the seller to act on the customer's behalf for inspection of all of the recommended steam traps newly installed in the plant and renewal of service book of these steam traps associated with the inspection during the predetermined period after the lump-sum replacement of the steam traps. Alternatively, the aggregating system effects the further steps of inputting stored diagnostic result data from the diagnostic device which has diagnosed a working condition of each of all the recommended steam traps newly installed in the plant after the lump-sum replacement of the existing steam traps by the recommended steam traps; and storing a steam trap service book comprising said inputted diagnostic result data in a database maintained by the seller.

That is, with this method of supporting sales and maintenance of steam traps, the inspecting operations and the service book renewing operation associated therewith which would require significant amount of labor and cost on the part of the customer can be eliminated. Further, as the inspecting operations are carried out by the seller of the steam traps, i.e. a specialist of steam traps, the working conditions of the steam traps may be obtained always with higher precision and reliability. In these respects, the customer can enjoy not only the above-described economical merit resulting from determination of timing of lump-sum replacement of the steam traps based on the comparison data obtained by implementing the aggregating system of the method having the first or second feature, but also the further merits in terms of maintenance of the steam traps and stable operation of the plant.

According to a fourth feature of the invention, in the construction having the third feature described above, the steam trap service book is stored in the database in such a manner that the service book is accessible from a customer's terminal via communication means.

That is to say, with this method of supporting sales and maintenance of steam traps, the steam trap service book may be stored at the single site, that is, centrally within the database of the aggregating system. Hence, compared with a case of storing the steam trap service books separately at the seller's side and the customer's side, the renewal of the steam trap service book can be effected more easily and accurately. Further, since the service book is stored at the side of the seller who effects the inspection of steam traps on behalf of the customer, the renewing operations of the steam trap service book can be carried out even more easily.

And, in addition to the greater ease and accuracy in renewal of the steam trap service book, as this service book is stored within the database in such a way as to be accessible from a customer's terminal via communication means (typically, Internet) when needed, the customer can grasp the working conditions of all of the steam traps installed in the plant just as easily as the case where the service book is stored on the customer's side.

According to a fifth feature of the invention, in the method of supporting sales and maintenance of steam traps having any one of the first through fourth features described above, the system effects the further step of adding, to a contract for lump-sum replacement of the steam traps to be concluded between the customer and a seller of the steam traps, a warranty contract for the seller to warrant the newly installed recommended steam traps for the predetermined period after the lump-sum replacement of the existing steam traps.

With the above-described method of supporting sales and maintenance of steam traps, during the predetermined period (that is, the warranty period of the recommended steam traps) after the lump-sum replacement of the existing steam traps by the recommended steam traps, the condition without steam loss due to malfunction of steam traps, in other words, the condition without economic loss from steam leak due to malfunction of the steam traps can be ensured reliably by the warranty. In these regards, the customer can enjoy not only the above-described economical merit resulting from determination of timing of lump-sum replacement of the steam traps based on the comparison data obtained by the implementation of the aggregating system of the method having the first or second feature, but also the further economical merit after the lump-sum replacement of the steam traps also.

According to a sixth feature of the invention, in the method of supporting sales and maintenance of steam traps having any one of the first through fifth features described above, the system effects the further step of adding, to a contract for lump-sum replacement of the steam traps to be concluded between the customer and a seller of the steam traps, a divided payment contract using a credit loan company.

That is, with this method of supporting sales and maintenance of steam traps, the customer need not reserve a significant amount of money required for the lump-sum replacement of all the existing steam traps, so that the fund raising plan of the plant becomes easier. Further, if needed, the customer can make the settlement of the payment for each installment within the limit of a predetermined ordinary budget allotted annually for the maintenance and repair of the steam traps. In these regards, the customer can enjoy not only the above-described economical merit resulting from determination of timing of lump-sum replacement of the steam traps based on the comparison data obtained by the implementation of the aggregating system of the method having the first or second feature, but also the additional significant merit in terms of fund raising plan.

According to a seventh feature of the invention, in the method of supporting sales and maintenance of steam traps having any one of the first through sixth features described above, in the step of diagnosing the working conditions of the existing steam traps for generating the comparison data or in the step of inspecting the steam traps under the maintenance contract concluded, the system effects the further step of inspecting working conditions of auxiliary plant devices other than and relating to the existing or newly installed recommended steam traps.

That is, with this method of supporting sales and maintenance of steam traps, when the working conditions of the steam traps are diagnosed for producing the comparison data or when the newly installed recommended steam traps are inspected under the maintenance contract concluded between the seller and the customer, the seller of the steam traps effects not only the diagnosis or inspection of these steam traps, but also the inspection of other auxiliary plant devices relating to the steam traps. Hence, this can reduce the burden of maintenance of such other devices on the customer. In these regards, the customer can enjoy not only the above-described economical merit resulting from determination of timing of lump-sum replacement of the steam traps based on the comparison data obtained by the implementation of the aggregating system of the method having the first or second feature, but also the additional significant merit in terms of maintenance of other related plant devices.

According to an eighth feature of the present invention, there is provided an aggregating system for use in a method of supporting sales and maintenance of steam traps, the system comprises:

inputting means for inputting stored diagnostic result data and model confirmation result data from a diagnostic device which has diagnosed a working condition of each of a plurality of existing steam traps installed in a customer's plant;

first calculating means for calculating, based on said diagnostic result data, a first total steam loss amount due to malfunction of steam traps, the first total steam loss amount comprising aggregation of actual steam leak amounts of all the existing steam traps;

second calculating means for calculating, based on said model confirmation data, a second total steam loss amount, which comprises aggregation of differences between inherent steam leak amounts of the existing steam traps under their normal working conditions and inherent steam leak amounts of recommended steam traps under their normal working conditions;

third calculating means for calculating a monetary conversion value of an integrated value of a sum of the first total steam loss amount and the second total steam loss amount integrated for a predetermined period;

comparison data generating means for generating comparison data allowing comparison between said monetary converted value and replacement costs required for lump-sum replacement of all the existing steam traps by the recommended steam traps; and outputting means for outputting said comparison data in a predetermined display format.

With this aggregating system, the aggregating operations after the diagnosis and model confirmation of each existing steam trap (that is, the extremely troublesome and laborious operation of aggregating the great amount of diagnostic result data and model confirmation result data and calculating the first total steam loss amount and the second total steam loss amount) can be carried out automatically and speedily with the calculations by the first and second calculating means. Therefore, by using this aggregating system, the seller of steam traps can readily implement the method of supporting sales and maintenance of steam traps having the first characterizing feature described above.

Further, with this aggregating system, the model confirmation result data of each existing steam trap can be stored within the diagnosing device together with the diagnostic result data and these model confirmation result data and the diagnostic result data can together be inputted to the inputting means from the diagnosing device. Hence, compared with a construction requiring manual inputting of these model confirmation result data and diagnostic result data by an operator, the inputting operation may be simple and the burden on the operator may be effectively reduced.

Moreover, with this aggregating system, for the production of the comparison data comparing the monetary converted value and the cost required for lump-sum replacement of the steam traps, the calculation of this monetary converted value (that is, the sum of the monetary converted value of the steam leak amount due to malfunction of the existing steam traps and the monetary converted value of the model difference between the existing steam traps and the recommended steam traps, which sum is integrated for a predetermined period) also can be carried out automatically and speedily by the third calculating means.

In addition, with this aggregating system, for the production of the comparison data, the calculation of the cost required for lump-sum replacement of the steam traps and the production of the comparison data for comparing the calculated cost and the monetary converted value calculated by the third calculating means too can be carried out automatically and speedily. And, the comparison data can be outputted in a predetermined display format for presentation to the customer during the sales and maintenance activities of the steam traps.

According to a ninth feature of the invention, in the system having the eighth feature;

the inputting means comprises means for inputting stored diagnostic result data and model confirmation result data from the diagnostic device which has diagnosed a working condition of each of some of the plurality of existing steam traps installed in the customer's plant;

the first calculating means comprises means for calculating an estimated value of the first steam loss amount based on the diagnostic result data and also on a trap number ratio comprising a ratio between the number of said some steam traps diagnosed and the total number of the existing steam traps; and the second calculating means comprises means for calculating an estimated value of the second total steam loss amount based on said model confirmation result data and also on said trap number ratio.

With this aggregating system, like the aggregating system having the eighth feature described above, the seller of steam traps can readily implement the method of supporting sales and maintenance of steam traps having the first feature described above. And, compared with a construction requiring manual inputting of these model confirmation result data and diagnostic result data by an operator, the inputting operation may too be simple and the burden on the operator may be effectively reduced.

In this construction, for inputting the trap number ratio, this may be done either by inputting the number of the sum steam traps diagnosed and the total number of the existing steam traps respectively or by directly inputting the trap number ratio between the diagnosed existing steam traps and all of the existing steam traps.

According to a tenth feature of the invention, in the system having the eighth or ninth feature described above, the system further comprises service book producing means for producing a steam trap service book in a predetermined format according to a predetermined procedure, based on the diagnostic result data inputted to the inputting means.

That is, with this aggregating system, by utilizing the diagnostic result data and the model confirmation result data of each steam trap which were obtained for production of the comparison data to be presented before the customer and inputted to the inputting means, a steam trap service book can be produced automatically and speedily. Consequently, the production of steam trap service book becomes extremely easy.

According to an eleventh feature of the present invention, in the aggregating system having any one of the eighth through tenth features described above;

in addition to the first total steam loss amount, said first calculating means further calculates, based on the diagnostic result data and the trap number ratio inputted to the inputting means, a first sub-total steam loss amount aggregating the steam loss amounts of some of the existing steam traps designated from the existing steam traps; and in addition to the second total steam loss amount, said second calculating means further calculates, based on the model confirmation result data inputted to the inputting means, a second sub-total steam loss amount aggregating the differences between inherent steam leak amounts of some of the existing steam traps designated from the existing steam traps under their normal working conditions and steam leak amounts of recommended steam traps under their inherent working conditions.

That is, with this aggregating system, when the customer receives the presentation of the comparison data from the steam trap seller who has implemented the method of supporting sales and maintenance of steam traps having the second characterizing feature, this customer may want to replacement of some designated steam traps (e.g. the existing stream traps installed in a certain limited section of the plant) by the recommended steam traps instead of lump-sum replacement of all the existing steam traps. In such case, like the system having the first feature, the seller may easily make appropriate presentation about the economical merit that the customer can expect to enjoy by such partial replacement, by using the first sub-total steam loss amount (that is, the amount of steam loss by the designated existing steam traps in the first total steam loss amount) and the second sub-total steam loss amount (that is, the amount of steam loss by the designated existing steam traps in the second total steam loss amount).

According to a twelfth feature of the present invention, in addition to an estimated value of the first total steam loss amount, said first calculating means further calculates, based on the diagnostic result data and the trap number ratio inputted to the inputting means, an estimated value of a first sub-total steam loss amount aggregating the steam loss amounts of some of the existing steam traps designated from the existing steam traps; and in addition to an estimated value of the second total steam loss amount, said second calculating means further calculates, based on the model confirmation result data inputted to the inputting means, an estimated value of a second sub-total steam loss amount aggregating the differences between inherent steam leak amounts of some of the existing steam traps designated from the existing steam traps under their normal working conditions and steam leak amounts of recommended steam traps under their inherent working conditions.

That is, with this aggregating system, when the customer receives the presentation of the comparison data from the steam trap seller who has implemented the method of supporting sales and maintenance of steam traps having the second characterizing feature, this customer may want to replacement of some designated steam traps by the recommended steam traps instead of lump-sum replacement of all the existing steam traps. In such case, like the system having the first feature, the seller may easily make appropriate presentation about the economical merit that the customer can expect to enjoy by such partial replacement, by using an estimated value of the first sub-total steam loss amount and an estimated value of the second sub-total steam loss amount.

According to a thirteenth feature of the present invention, in the aggregating system having any one of the eighth through twelfth features, the second calculating means calculates the second total steam loss amount or the estimated value thereof and the second sub-total steam loss amount or the estimated value thereof for each of a plurality of models of recommended steam traps.

That is, with this aggregating system, when the customer receives the presentation of the comparison data from the steam trap seller who has implemented the method of supporting sales and maintenance of steam traps having the first characterizing feature, this customer may want further presentation of comparison data for a plurality of recommended models of steam traps as possible candidates for replacement. In such case, the seller may easily make appropriate presentation about the requested comparison data enabling comparison between or among the plurality of recommended models, by using the calculation result of the second calculating means.

Further, when the customer wants partial replacement of some designated existing steam traps rather than the lump-sum replacement of all of the existing steam traps and wants also presentation of the comparison data about the plurality of recommended models of steam traps, the second sub-total steam loss amount and its estimated value may be readily calculated by the second calculating means.

In the foregoing description of the aggregating systems having the eleventh through thirteenth feature, in the case of partial replacement for replacing some of the existing steam traps by the recommended steam trap, the degree of the economical merit enjoyable by the customer is presented before the customer by using the first sub-total steam loss amount and its estimated value and the second sub-total steam loss amount and its estimated value. However, in implementing the aggregating system having the eleventh through thirteenth features, it is preferred to produce comparison data similar to the comparison data produced in the case of the lump-sum replacement of the steam traps with using the first sub-total steam loss amount or its estimated value and the second sub-total steam loss amount or its estimated value (that is, the comparison data comparing the monetary converted value with the costs required for lump-sum replacement of all the existing steam traps by the recommended steam traps, the monetary converted value comprising the integrated value integrating the sum of the first sub-total steam loss amount and the second sub-total steam loss amount or the sum of the estimated value of the first sub-total steam loss amount and the estimated value of the second sub-total steam loss amount (see FIGS. 6 through 8) and then to show the degree of economical merit enjoyable by the customer by the partial replacement by presenting such comparison data.

Further and other features and advantages of the present invention will become apparent from the following detailed description of the preferred embodiments with reference to the accompanying drawings.

BRIEF DESCRIPTION OF THE DRAWINGS

FIG. 7 is a block diagram showing a still further mode of aggregation procedure relating to a still further embodiment of the invention, and FIG. 8 is a block diagram showing a still further mode of aggregation procedure relating to a still further embodiment of the invention.

DESCRIPTION OF THE PREFERRED EMBODIMENTS

Figure 1:
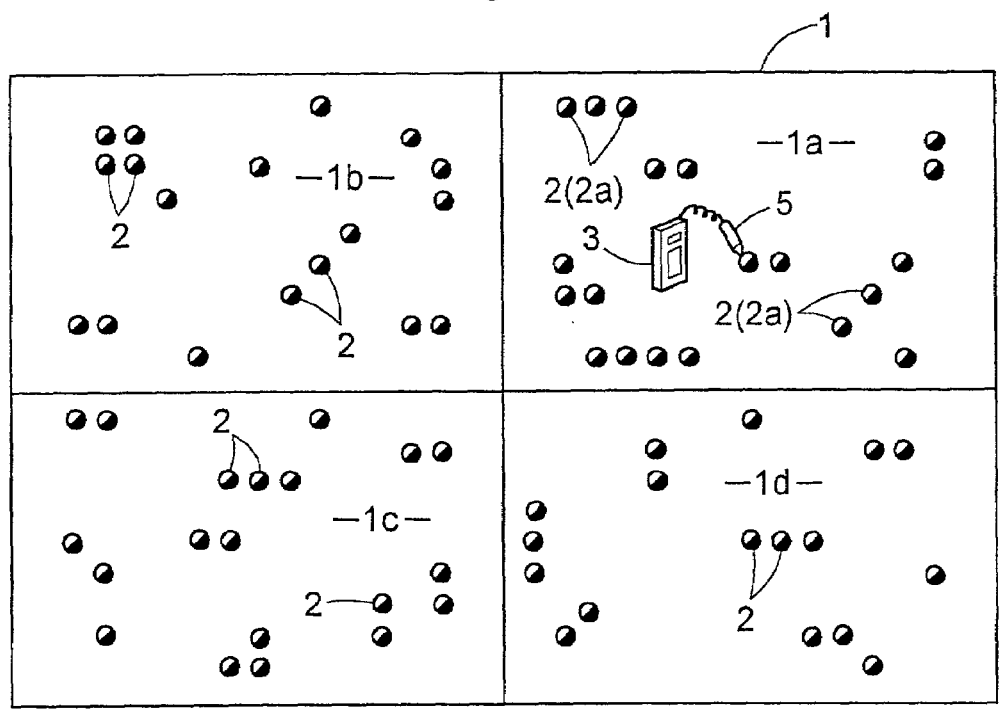
FIG. 1 is a conceptual view of a plant for which the method or system relating to the present invention is to be implemented.

In FIG. 1, numeral 1 denotes a facility such as a factory or a plant using a great number of steam traps 2 therein of its operation. A seller of steam traps, in its sales and/or maintenance activities of steam traps directed to this plant 1, sends an inspecting person for an on-site inspection of the steam traps upon consultation and agreement with a client, that is, a customer running the plant. Upon arrival on the site, by using a portable diagnosing device 3, the inspecting person inspects or diagnoses one after another each of all the steam traps 2a installed at a diagnosis target area(s) 1a of the plant, the target area(s) being determined in advance in the consultation with the customer.

Figure 3:
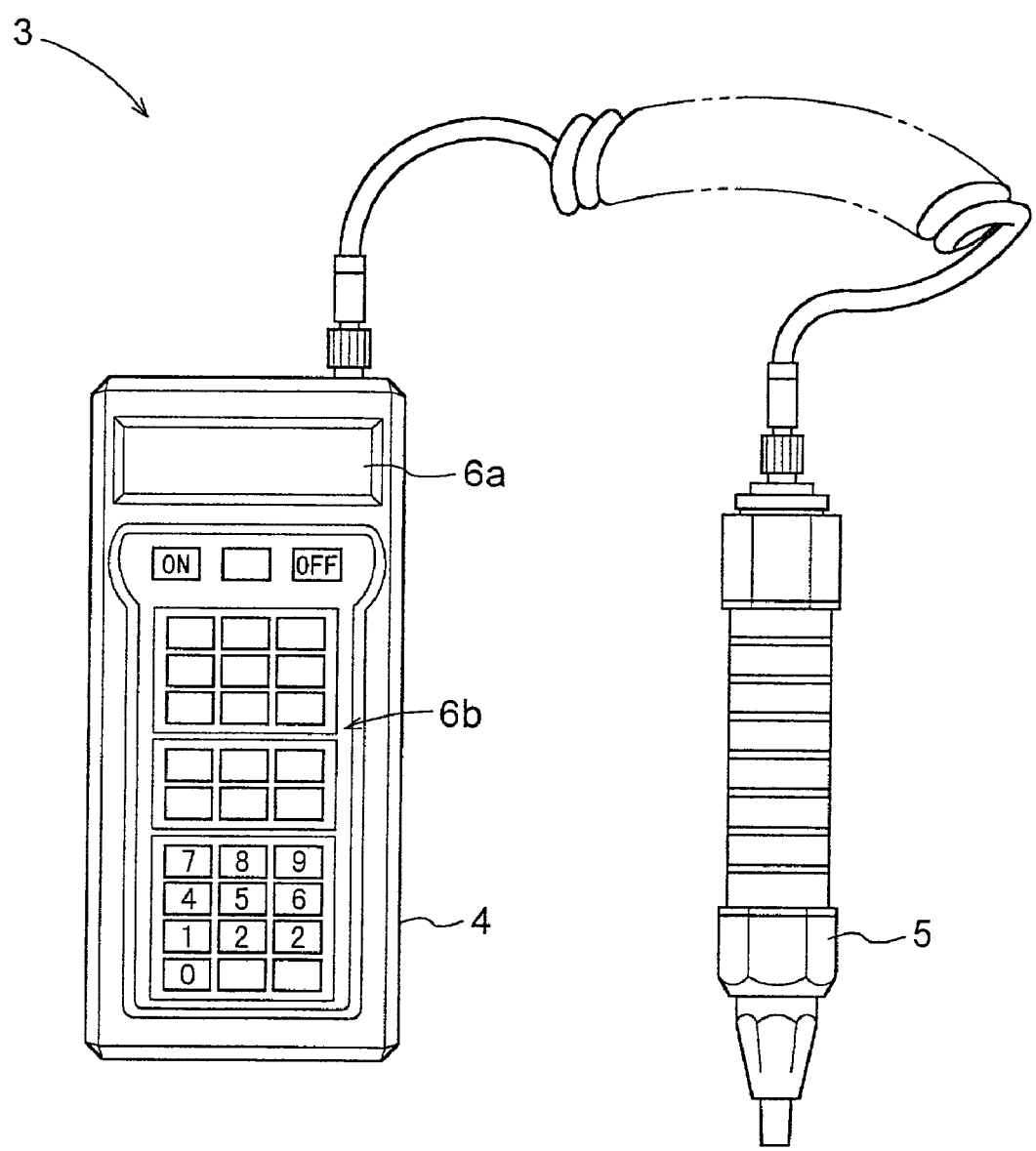
FIG. 3 is a construction diagram of a diagnosing device.

The diagnosing device 3 is shown in FIG. 3, in which numeral 4 denotes a device body and numeral 5 denotes a detector cable-connected to the device body 4. The device body 4 includes a display section 6a for displaying inputted contents, diagnostic result data, etc. and an inputting section 6b having a variety of input keys.

For diagnosing the existing steam traps 2a by using this diagnosing device 3, the inspecting person checks and confirms the model, bore diameter, usage of each steam trap 2a and inputs these confirmed data to the diagnosing device 3 together with other data such as the area where the steam trap is installed, the serial service number of the steam trap, the date of diagnosis, etc. However if these data such as the confirmed data and the diagnosis date were downloaded in advance from a computer to the diagnosing device 3, it is not necessary to input such data again and it will suffice to confirm them. The inspecting person places a detecting end of the detector 5 into contact with a predetermined position on the existing steam trap 2a for detecting the surface temperature and vibration of the existing steam trap 2a.

Upon this detection, an arithmetic unit included in the device body 4 calculates a working steam pressure of the existing steam trap 2a, based on the detected surface temperature thereof. The arithmetic unit further calculates a steam leak amount due to malfunction, if any, of the existing steam trap 2a by collating the calculated working steam pressure and the detected vibration to a predetermined relationship between vibration and steam leak amount, the relationship including a pre-inputted steam pressure as a parameter thereof. Then, the arithmetic unit stores the results of these calculations (example of "diagnostic result data") together with the installed area, serial service number, model, bore diameter, usage (example of "model confirmation result data") previously inputted within a storage unit incorporated within the device body 4.

Figure 2:
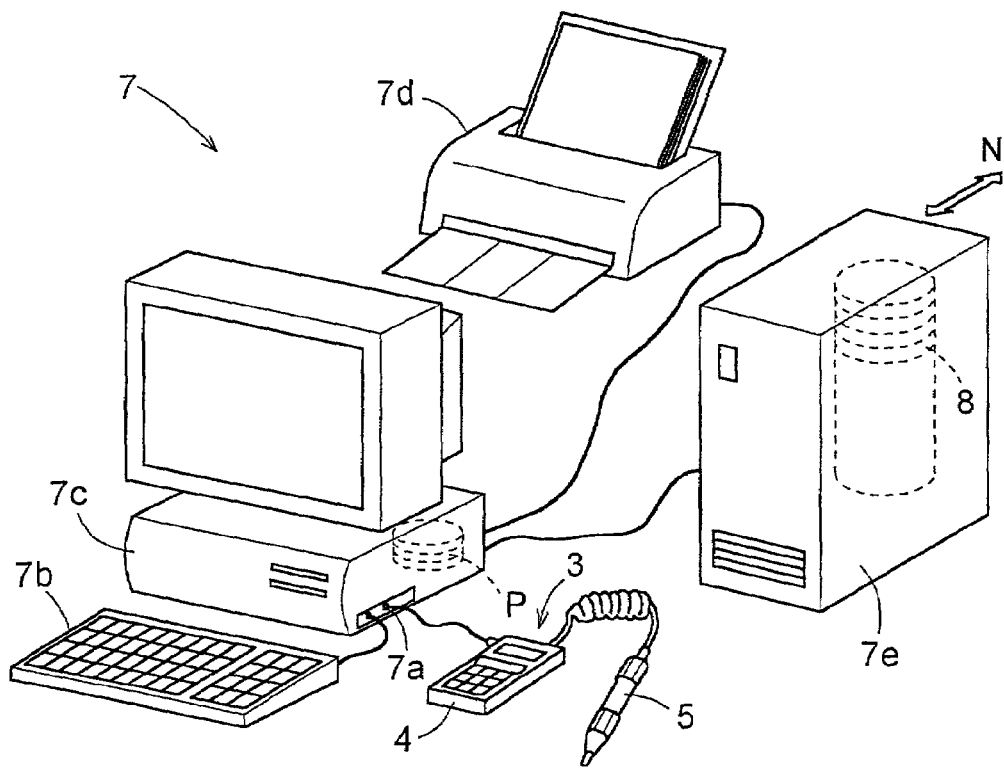
FIG. 2 is a conceptual view of an aggregating system according to one aspect of the present invention.

These data stored within the storage of the diagnosing device 3 including the diagnostic result data and the model confirmation result data of each existing steam trap 2a comprise input data that a computer system 7 receives from the diagnosing device 3 when this diagnosing device 3 is connected to the computer system 7 as illustrated in FIG. 2. Separately, the computer system 7 also inputs, from its keyboard 7b, data about the other existing steam traps 2 installed in the other areas 1b–1d than the diagnosed area 1a in the plant 1 which data include not only the number of the other steam traps as well as other information about them which can be known from a reference material.

Figure 4:
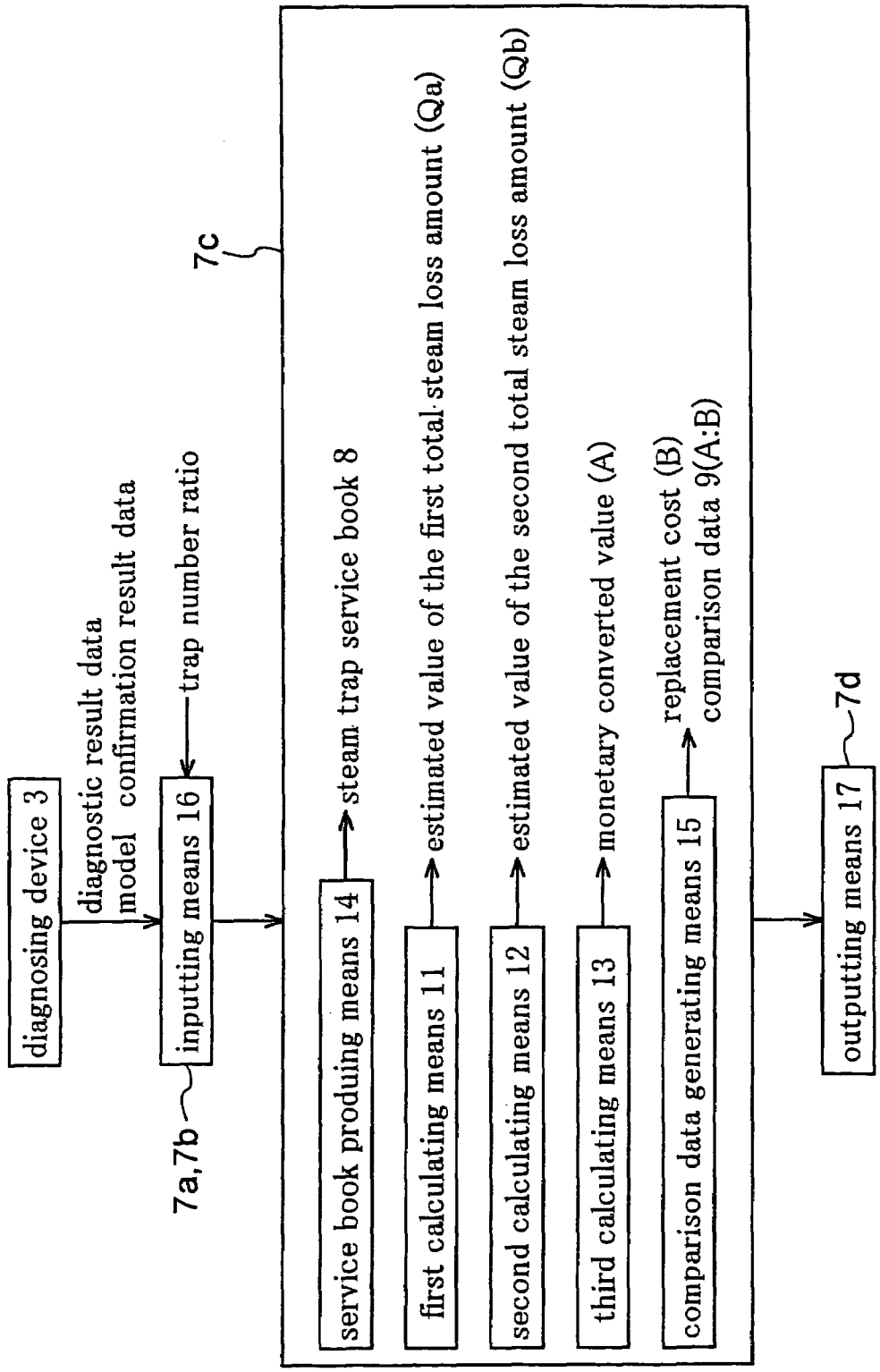
FIG. 4 is a block diagram showing a mode of aggregation relating to an embodiment of the invention.

Based on these inputted data, the computer system 7 (see FIG. 4) executes a pre-installed predetermined calculating/producing procedure 50 (that is, the procedure carried out by execution of a calculating/producing program installed therein) thereby to calculate a monetary converted value of the steam leak amount of each malfunctioning trap in the diagnosed existing steam traps 2a. Then, the computer system 7 produces a steam trap service book 8 for the entire plant in a predetermined format including items of the installed area, serial service number, model, bore diameter, usage, surface temperature, vibration, working steam pressure, working condition determination result (normal or not), steam leak amount due to the malfunction of the steam trap, its monetary converted value and the diagnosis date, etc.

Separately from the above, in response to an instruction for producing further comparison data, this computer system 7 further calculates, based on the above-described input data including the number of the existing steam traps of the diagnosed area 1 (i.e. the number of the diagnosed existing steam traps) and the number of the other existing steam traps in the other undiagnosed areas 1b–1d, an estimated value of a first total steam loss amount (Qa) (that is, an estimated value calculated by multiplying a sum of steam leak amounts (qa) due to malfunction of the diagnosed steam traps 2a by a trap number ratio between the number of all of the existing steam traps in the plant 1 and the number of the diagnosed steam traps). Furthermore, this computer system 7 calculates an estimated value of a second total steam loss amount (Qb) which comprises aggregation of differences (qb) between normal or inherent steam leak amounts of all the existing steam traps 2 under their normal working conditions and steam leak amounts of recommended steam traps (in the present embodiment, a free-float type steam trap) under their normal working conditions, the estimated value being calculated by multiplying the sum of steam leak amount differences (qb) due to the model difference by the above-described trap number ratio, by using pre-inputted data relating to steam leak amount difference between a recommended model of steam trap and another model of steam trap under their normal working conditions.

The computer system 7 proceeds further to integrate the sum of the estimated value of the first total steam loss amount (Qa) and the estimated value of the second total steam loss amount (Qb) for a predetermined period (in this embodiment, this predetermined period corresponds to the warranty period of the recommended steam trap) and converts this integrated sum into a monetary converted value (A). Still further, the computer system 7 calculates a cost (B) of lump-sum replacement required for replacing all of the existing steam traps 2 including those steam traps operating normally in the plant 1 by the recommended steam traps, by using unit cost data inputted in advance and then produces comparison data between the monetary converted value (A) and the lump-sum replacement cost (B) in a predetermined display form.

That is to say, in this embodiment, the above-described computer system 7 constitutes an aggregating system for aggregating the diagnostic result data and the model confirmation result data of the existing steam traps 2a. And, a connecting portion 7a of this computer system 7 for connection to the diagnosing device 3 and the keyboard 7b of the same together constitute inputting means 16 in this aggregating system for inputting the diagnostic result data from the diagnosing device 3 and the model confirmation result data stored in the diagnosing device 3 for each existing steam trap 2a.

And, a computer unit 7c of this computer system 7 constitutes, in the aggregating system, service book producing means 14, first calculating means 11, second calculating means 13 and comparison data generating means 15 to be detailed below.

Namely, the service book producing means 14 produces a steam trap service book 8 in a predetermined format according to a predetermined procedure 50, based on the diagnostic result data inputted to the inputting means 16.

The first calculating means 11 calculates the estimated value of the first steam loss amount (Qa) according to the predetermined procedure based on the diagnostic result data inputted to the inputting means 16 and also on the trap number ratio between the number of the diagnosed existing steam traps 2a and the total number of all the existing steam traps 2 in the plant 2.

The second calculating means 12 calculates the estimated value of the second total steam loss amount (Qb) according to the predetermined procedure 50, based on the model confirmation result data inputted to the inputting means 16 and also on the above-described trap number ratio.

The third calculating means 13 calculates, according to the predetermined procedure 50, the monetary converted value (A) of the integrated value obtained by integrating the sum of the estimated value of the first total steam loss amount (Qa) calculated by the first calculating means 11 and the estimated value of the second total steam loss amount (Qb) calculated by the second calculating means 12 for the predetermined period.

In accordance with the predetermined procedure 50, the comparison data generating means 15 calculates the lump-sum replacement cost (B) required for lump-sum replacement of all of the existing steam traps including normally operating steam traps in the plant 1 by the recommended steam traps and generates the comparison data, in the predetermined data displaying form, comparing the calculated cost (B) and the monetary converted value (A) calculated by the third calculating means 13.

Incidentally, the free-float type steam trap provided as the recommended steam trap in the present embodiment has a much smaller inherent steam leak amount under the normal working condition as small as $frax;1;15$ to $frax;1;10$ of that of the disc type steam trap and ⅛ to ⅕ of that of the bucket type steam *trap. For* this *reason,* if the plant 1 presently employs many *non-free-float* type steam traps such as the disc type or bucket *type*, the estimated value of the second total steam loss amount (Q*b*) will be considerable and the monetary converted value (A) thereof too will be *considerable*.

After the above-described aggregation process, in sales/maintenance activities, the seller of the steam traps presents the comparison data 9 outputted by appropriate outputting means 17 such as a printer 7*d*. Then, with reference to this comparison data 9, the seller of steam traps will explain to the customer the expected economical merit from lump-sum replacement of all the existing steam traps 2 including those normally operating in the plant 1 by the recommended steam traps and proposes such lump-sum replacement of the steam traps.

During this sales/maintenance activity, the seller can offer also some optional contracts which can be added to the main contract of lump-sum replacement of the steam traps, explaining their respective merits in terms of maintenance and fund planning. Such optional contracts include guarantee warranty guaranteeing the performance of the recommended steam traps for the predetermined period after the lump-sum replacement of the steam traps, a maintenance contract for the seller to act on the customer's behalf for inspection of all of the steam traps 2 (i.e. all of the recommended steam traps newly installed) of the plant 1 and renewal of the service book 8 of the steam traps associated with the inspection during the predetermined period after the lump-sum replacement of the steam traps and a divided payment contract using a credit loan company for the payment of the cost required for the lump-sum replacement of the steam traps.

Incidentally, the steam trap service book 8 to be renewed by the seller on behalf of the customer under the above-described maintenance contract is stored at a database of the seller (e.g. a server 7*e* of the computer system 7) in such a way that the book is accessible by the customer (from its terminal) when needed via the Internet 20 (an example of "communication means"). With this, the customer can grasp the working conditions of all of the steam traps 2 newly installed in the plant 1 by accessing the steam trap service book 8 from the customer's terminal connected to the Internet as easily as the case the steam trap service book 8 is stored by the customer per se. In this manner, it is possible to unify the steam trap service book 8 for facilitating its maintenance.

Next, other embodiments of the invention will be described.

In the foregoing embodiment, based on the diagnostic result data and the model confirmation result data obtained for some of the existing steam traps 2 installed in the plant 1 and also on the trap number ratio between the number of the diagnosed existing steam traps 2*a* and the total number of the existing steam traps 2 in the plant, the estimated value of the first steam loss amount (Qa) and the estimated value of the second total steam loss amount (Qb) are calculated respectively by the first calculating means 11 and the second calculating means 12. Then, the sum of these values, i.e. the estimated value of the first total steam loss amount (Qa) and the estimated value of the second total steam loss amount (Qb) are integrated for the predetermined period and then converted into the monetary converted value (A). Thereafter, there are produced the comparison data 9 comparing this monetary converted value (A) with the lump-sum replacement cost (B) of the steam traps.

Figure 5:
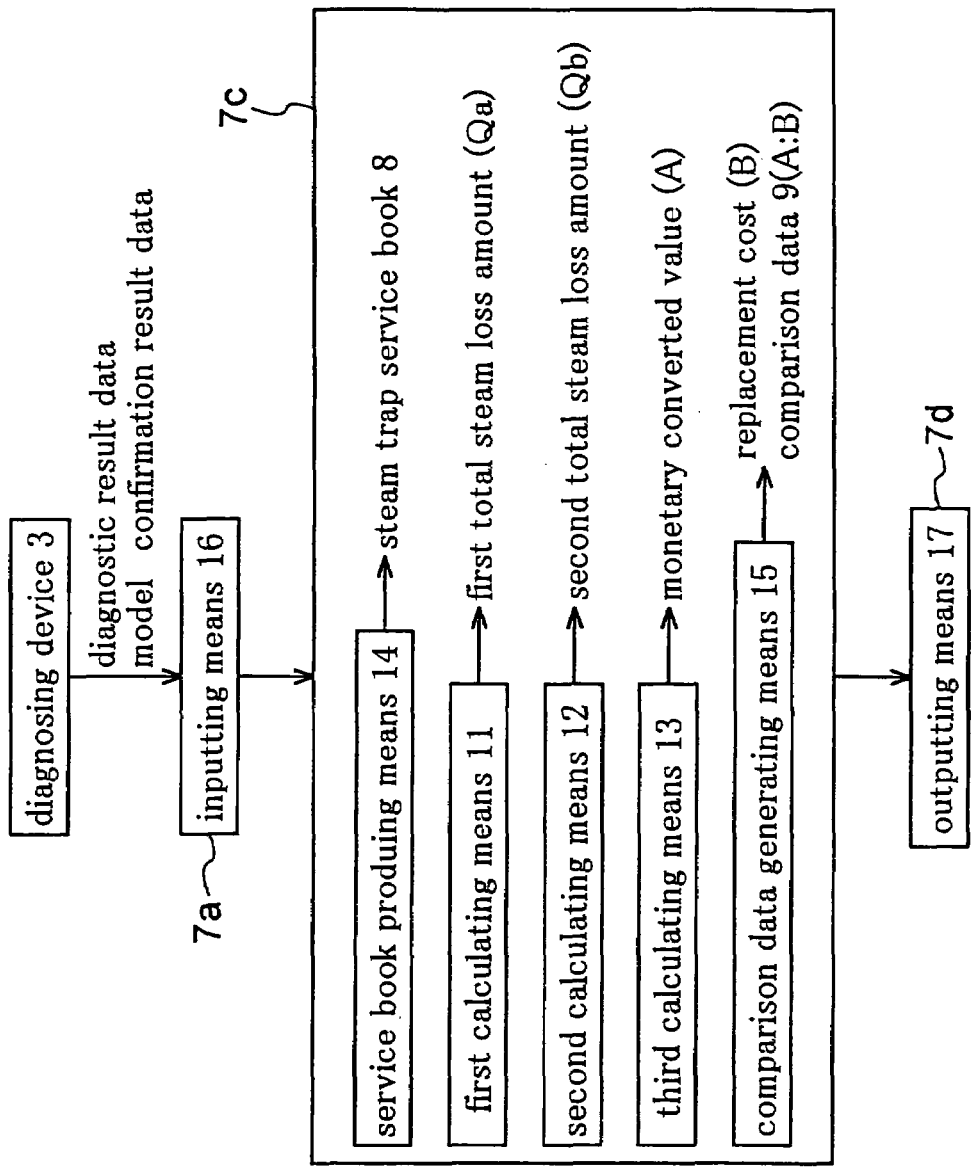
FIG. 5 is a block diagram showing a further mode of aggregation procedure relating to a further embodiment of the invention.

Alternatively, as illustrated in FIG. 5, the first calculating means 11 and the second calculating means 12 of the aggregating system may calculate the first total steam loss amount (Qa) and the second total steam loss amount (Qb), based on the diagnostic result data and the model confirmation result data obtained from all of the existing steam traps 2*a* in the plant 1. Then, the sum of these first and second total steam loss amounts (Qa), (Qb) is integrated and then converted into a monetary converted value (A). Then, this monetary converted value (A) and the lump-sum replacement cost (B) may together constitute the comparison data 9.

Figure 6:
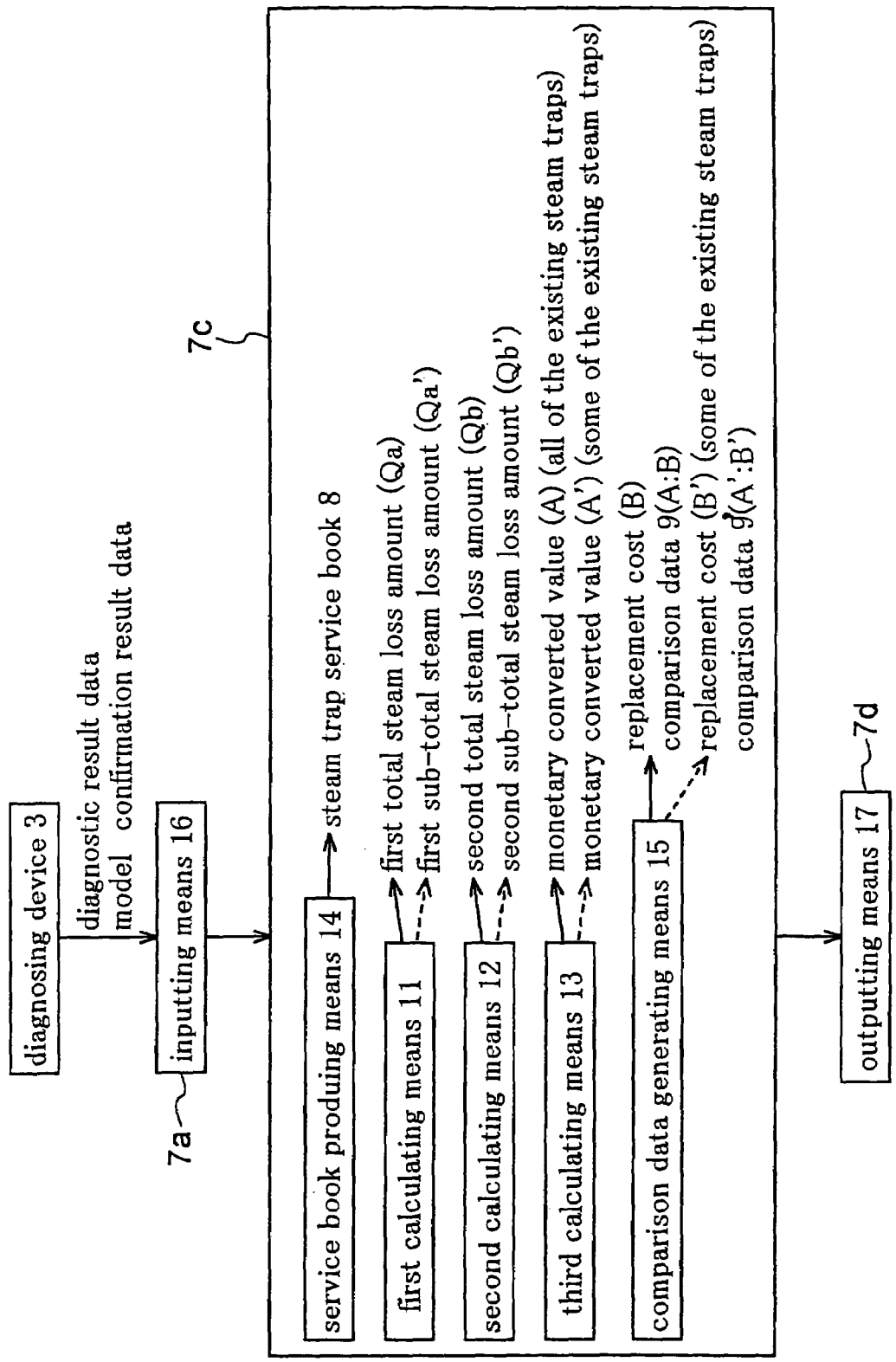
FIG. 6 is a block diagram showing a still further mode of aggregation procedure relating to a still further embodiment of the invention.

Further, when the first and second calculating means 11, 12 of the aggregating system 7 calculates the first total steam loss amount (Qa) and the second steam loss amount (Qb) based on the diagnostic result data and the model confirmation result data of all of the existing steam traps 2 as described above, the respective means may be constructed as illustrated in FIG. 6. Namely, the first calculating means 11 may calculate, in addition to the first total steam loss amount (Qa), a first sub-total steam loss amount (Qa') aggregating the steam loss amounts (qa) of some of the existing steam traps designated from the existing steam traps 2 of the plant 1.

Further, the second calculating means 12 may calculate, in addition to the second total steam loss amount (Qb), a second sub-total steam loss amount (Qb') aggregating the differences (qb) between normal steam leak amounts of some of the existing steam traps designated from the existing steam traps of the plant 1 under their normal working conditions and steam leak amounts of recommended steam traps under their normal working conditions.

Then, in case the customer desires a partial replacement for replacing only some designated existing steam traps by the recommended steam traps among all the existing steam traps 2 of the plant, it is possible to show to this customer the degree of economical merit enjoyable from such partial replacement, with using the first sub-total steam loss amount (Qa') and the second sub-total steam loss amount (Qb') calculated respectively by the first and second calculating means (11), (12).

Similarly, in case the first and second calculating means 11, 12 of the aggregating system 7 calculate respectively the estimated value of the first total steam loss amount (Qa) and the estimated value of the second total steam loss amount (Qb) based on the diagnostic result data, the model confirmation result data obtained from some of the existing steam traps 2 of the plant 1 and also on the trap number ratio, the construction may be modified as illustrated in FIG. 7.

That is, the first calculating means may effect calculation of the estimated value of the first sub-total steam loss amount (Qa') in addition to the calculation of the estimated value of the first total steam loss amount (Qa).

Further, the second calculating means may effect calculation of the estimated value of the second sub-total steam loss amount (Qb') in addition to the calculation of the estimated value of the second total steam loss amount (Qb).

With this modified construction, it is possible to show to the customer the degree of economical merit enjoyable from such partial replacement, with using the estimated value of the first sub-total steam loss amount (Qa') and the estimated value of the second sub-total steam loss amount (Qb') calculated respectively by the first and second calculating means (11), (12).

Still further, as shown in FIG. 8, the second calculating means 12 of the aggregating system may calculate the second total steam loss amount (Qb) or its estimated value, or the second sub-total steam loss amount (Qb') or its estimated value, for each of a plurality of models of recommended steam traps. With this, it is possible to show to the customer the degree of respective economical merit enjoyable with replacement by each model of the plurality of recommended steam traps.

In implementing the method or system of the invention for supporting sales and maintenance of steam traps, the method or system may be implemented to include not only the replacement and/or maintenance of the existing steam traps in a plant 1, but also replacement and/or maintenance of other plant devices other than and relating to the steam traps 2 to be carried out together with the inspection of the steam traps 2 (i.e. the recommended steam traps newly installed) under the concluded maintenance contract. Hence, such construction will further increase the merit in terms of maintenance for the customer.

The foregoing embodiments are directed to steam traps. However, the method and the system of the invention may be directed also to air traps or gas traps other than the steam traps.

The present invention may be embodied in other form than described above. Various modifications and changes will be obvious to those skilled in the art without departing from the essential spirit of the invention. The disclosed embodiments are provided for the purpose of illustration of some specific examples only, not limiting the scope of the invention which scope is set forth in the appended claims.

What is claimed is:

1. A method of supporting sales and maintenance of steam traps, the method utilizes an aggregating system, comprising the steps of:
   inputting stored diagnostic result data and model confirmation result data from a diagnostic device which has diagnosed a working condition of each of a plurality of existing steam traps installed in a customer's plant;
   calculating, based on said diagnostic result data, a first total steam loss amount due to malfunction of steam traps, the first total steam loss amount comprising aggregation of steam leak amounts of all the existing steam traps;
   calculating, based on said model confirmation result data, a second total steam loss amount, which comprises aggregation of differences between inherent steam leak amounts of the existing steam traps under their normal working conditions and inherent steam leak amounts of recommended steam traps under their normal working conditions;
   calculating a monetary conversion value of an integrated value of a sum of the first total steam loss amount and the second total steam loss amount integrated for a predetermined period;
   generating comparison data allowing comparison between said monetary converted value and a replacement cost required for lump-sum replacement of all the existing steam traps by the recommended steam traps; and
   outputting said comparison data for presentation to the customer in at least one of: sales and maintenance activities of the recommended steam traps.

2. The method according to claim 1, wherein,
   in said inputting step, the aggregating system inputs stored diagnostic result data and model confirmation result data from the diagnostic device which has diagnosed a working condition of each of some of the plurality of existing steam traps installed in the customer's plant; and
   in said step of calculating the first total steam loss amount, the system calculates an estimated value of the first steam loss amount based on the diagnostic result data and also on a trap number ratio comprising a ratio between the number of said some steam traps diagnosed and the total number of the existing steam traps;
   in said step of calculating the second total steam loss amount, the system calculates an estimated value of the second total steam loss amount based on said model confirmation result data and also on said trap number ratio; and
   in said step of calculating the monetary conversion value, the system calculates the monetary conversion value of an integrated value of a sum of the estimated value of the first total steam loss amount and the estimated value of the second total steam loss amount for the predetermined period.

3. The method according to claim 1, the system effects the further step of adding, to a contract for lump-sum replacement of the steam traps to be concluded between the customer and a seller of the steam traps, a maintenance contract for the seller to act on the customer's behalf for inspection of all of the recommended steam traps newly installed in the plant and renewal of service book of these steam traps associated with the inspection during the predetermined period after the lump-sum replacement of the steam traps.

4. The method according to claim 3, wherein the steam trap service book is stored in a database maintained by the seller in such a manner that the service book is accessible from a customer's terminal via communication means.

5. The method according to claim 1, wherein the aggregating system effects the further steps of inputting stored diagnostic result data from the diagnostic device which has diagnosed a working condition of each of all the recommended steam traps newly installed in the plant after the lump-sum replacement of the existing steam traps by the recommended steam traps; and
   storing a steam trap service book comprising said inputted diagnostic result data in a database maintained by the seller.

6. The method according to claim 1, wherein the system effects the further step of adding, to a contract for lump-sum replacement of the steam traps to be concluded between the customer and a seller of the steam traps, a warranty contract for the seller to warrant the newly installed recommended steam traps for the predetermined period after the lump-sum replacement of the existing steam traps.

7. The method according to claim 1, wherein the system effects the further step of adding, to a contract for lump-sum replacement of the steam traps to be concluded between the customer and a seller of the steam traps, a divided payment contract using a credit loan company.

8. The method according to claim 1, wherein in the step of diagnosing the working conditions of the existing steam traps for generating the comparison data or in the step of inspecting the steam traps under the maintenance contract concluded, the system effects the further step of inspecting working conditions of auxiliary plant devices other than and relating to the existing or newly installed recommended steam traps.

9. An aggregating system for use in a method of supporting sales and maintenance of steam traps, the system comprising:
   inputting means for inputting stored diagnostic result data and model confirmation result data from a diagnostic device which has diagnosed a working condition of each of a plurality of existing steam traps installed in a customer's plant;

first calculating means for calculating, based on said diagnostic result data, a first total steam loss amount due to malfunction of steam traps, the first total steam loss amount comprising aggregation of actual steam leak amounts of all the existing steam traps;

second calculating means for calculating, based on said model confirmation data, a second total steam loss amount, which comprises aggregation of differences between inherent steam leak amounts of the existing steam traps under their normal working conditions and inherent steam leak amounts of recommended steam traps under their normal working conditions;

third calculating means for calculating a monetary conversion value of an integrated value of a sum of the first total steam loss amount and the second total steam loss amount integrated for a predetermined period;

comparison data generating means for generating comparison data allowing comparison between said monetary converted value and replacement costs required for lump-sum replacement of all the existing steam traps by the recommended steam traps; and outputting means for outputting said comparison data in a predetermined display format.

10. The system according to claim 9, wherein the inputting means comprises means for inputting stored diagnostic result data and model confirmation result data from the diagnostic device which has diagnosed a working condition of each of some of the plurality of existing steam traps installed in the customer's plant; and the first calculating means comprises means for calculating an estimated value of the first steam loss amount based on the diagnostic result data and also on a trap number ratio comprising a ratio between the number of said some steam traps diagnosed and the total number of the existing steam traps; and the second calculating means comprises means for calculating an estimated value of the second total steam loss amount based on said model confirmation result data and also on said trap number ratio.

11. The system according to claim 9, further comprising service book producing means for producing a steam trap service book in a predetermined format according to a predetermined procedure, based on the diagnostic result data inputted to the inputting means.

12. The system according to claim 9, wherein in addition to the first total steam loss amount, said first calculating means further calculates, based on the diagnostic result data and the trap number ratio inputted to the inputting means, a first sub-total steam loss amount aggregating the steam loss amounts of some of the existing steam traps designated from the existing steam traps; and in addition to the second total steam loss amount, said second calculating means further calculates, based on the model confirmation result data inputted to the inputting means, a second sub-total steam loss amount aggregating the differences between inherent steam leak amounts of some of the existing steam traps designated from the existing steam traps under their normal working conditions and steam leak amounts of recommended steam traps under their inherent working conditions.

13. The system according to claim 10, wherein in addition to an estimated value of the first total steam loss amount, said first calculating means further calculates, based on the diagnostic result data and the trap number ratio inputted to the inputting means, an estimated value of a first sub-total steam loss amount aggregating the steam loss amounts of some of the existing steam traps designated from the existing steam traps; and in addition to an estimated value of the second total steam loss amount, said second calculating means further calculates, based on the model confirmation result data inputted to the inputting means, an estimated value of a second sub-total steam loss amount aggregating the differences between inherent steam leak amounts of some of the existing steam traps designated from the existing steam traps under their normal working conditions and steam leak amounts of recommended steam traps under their inherent working conditions.

14. The system according to claim 9, wherein the second calculating means calculates the second total steam loss amount for each of a plurality of models of recommended steam traps.

15. The system according to claim 10, wherein the second calculating means calculates the estimated value of the second total steam loss amount for each of a plurality of models of recommended steam traps.

16. The system according to claim 12, wherein the second calculating means calculates the second sub-total steam loss amount for each of a plurality of models of recommended steam traps.

17. The system according to claim 13, wherein the second calculating means calculates the estimated value of the second sub-total steam loss amount for each of a plurality of models of recommended steam traps.

* * * * *